United States Patent
Senoo et al.

(10) Patent No.: US 10,044,023 B2
(45) Date of Patent: Aug. 7, 2018

(54) MOLTEN SALT BATTERY

(71) Applicant: Sumitomo Electric Industries, Ltd., Osaka-shi (JP)

(72) Inventors: Kikuo Senoo, Osaka (JP); Mizuo Iwasaki, Osaka (JP); Yasushi Mochida, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 281 days.

(21) Appl. No.: 15/104,839

(22) PCT Filed: Nov. 6, 2014

(86) PCT No.: PCT/JP2014/079385
§ 371 (c)(1),
(2) Date: Jun. 15, 2016

(87) PCT Pub. No.: WO2015/093173
PCT Pub. Date: Jun. 25, 2015

(65) Prior Publication Data
US 2016/0329551 A1  Nov. 10, 2016

(30) Foreign Application Priority Data

Dec. 17, 2013 (JP) .................................. 2013-259917

(51) Int. Cl.
*H01M 2/34* (2006.01)
*H01M 2/30* (2006.01)
*H01M 10/39* (2006.01)

(52) U.S. Cl.
CPC ............. *H01M 2/348* (2013.01); *H01M 2/30* (2013.01); *H01M 10/399* (2013.01); *H01M 2200/103* (2013.01)

(58) Field of Classification Search
CPC .......................... H01M 2/348; H01M 10/399
(Continued)

(56) References Cited

U.S. PATENT DOCUMENTS

2005/0253458 A1* 11/2005 Omae ..................... H01M 6/36
307/10.1
2009/0320277 A1* 12/2009 Barrella .................. H01M 2/34
29/623.1

FOREIGN PATENT DOCUMENTS

JP   08-077983        3/1996
JP   8-185889 A       7/1996
(Continued)

OTHER PUBLICATIONS

International Search Report in PCT International Application No. PCT/JP2014/079385, dated Jan. 13, 2015.

*Primary Examiner* — Basia Anna Ridley
*Assistant Examiner* — James M Erwin
(74) *Attorney, Agent, or Firm* — Venable LLP; Michael A. Sartori; Miguel A. Lopez (57) ABSTRACT

A molten salt battery includes an electrode group which includes a first electrode, a second electrode, and a separator electrically insulating the first electrode and the second electrode; a molten salt electrolyte; a bottomed case which houses the electrode group and the molten salt electrolyte, the bottomed case having an opening; a cover plate which seals the opening of the case; a first external terminal of the first electrode and a second external terminal of the second electrode which are provided on the cover plate; a bus bar component fixed to the first external terminal; a first insulating part which is interposed between the first external terminal and the bus bar component so as to electrically insulate the bus bar component and the first external terminal; a thermal fuse component which is electrically connected to the bus bar component and the first external terminal and provides electrical continuity between the bus bar component and the first external terminal when the ambient temperature is lower than a reference temperature T1; and a fixing member which fixes the thermal fuse (Continued)

component to the cover plate in such a state that the thermal fuse component is in contact with or in close vicinity to the surface of the cover plate. The molten salt battery is configured such that a charge current is input from the bus bar component to the first external terminal through the thermal fuse component.

8 Claims, 8 Drawing Sheets

(58) Field of Classification Search
USPC .......................................................... 429/61
See application file for complete search history.

(56) References Cited

FOREIGN PATENT DOCUMENTS

| | | |
|---|---|---|
| JP | 9-161843 A | 6/1997 |
| JP | 2000-182675 A | 6/2000 |
| JP | 2000-243378 A | 9/2000 |
| JP | 2002-260631 A | 9/2002 |
| JP | 2004-178994 A | 6/2004 |
| JP | 2004-228045 A | 8/2004 |
| JP | 2012-043771 A | 3/2012 |
| JP | 2013-098108 A | 5/2013 |

* cited by examiner

MOLTEN SALT BATTERY

TECHNICAL FIELD

The present invention relates to a molten salt battery which includes an electrode group including a first electrode, a second electrode, and a separator interposed therebetween, and a molten salt electrolyte, and which is provided with a safety mechanism including a thermal fuse, a bimetal, a PTC device, or the like.

BACKGROUND ART

In recent years, electricity storage devices that are used for portable information terminals, electric vehicles, power storage apparatuses for household use, and the like have been progressively developed. Among electricity storage devices, capacitors and nonaqueous electrolyte secondary batteries have been actively studied. In particular, as electricity storage devices that are capable of increasing capacity and energy density and have a high degree of safety, expectations are high for development of molten salt batteries. Molten salt batteries use incombustible molten salt electrolytes and, therefore, are safer than electricity storage devices that use nonaqueous electrolytes, e.g., lithium-ion secondary batteries.

A molten salt battery includes an electrode group including a first electrode, a second electrode, and a separator interposed therebetween; and a molten salt electrolyte. Each electrode includes a current collector (electrode core) and an active material disposed on the current collector. The electrode group and the molten salt electrolyte are, for example, housed in a rectangular case. In an electricity storage device having a rectangular case, it is common to place a cover plate on the opening of the case such that electricity-generating elements, such as an electrode group and a molten salt electrolyte, are hermetically enclosed in the case (refer to PTL 1).

On the other hand, with increases in the capacity and volume energy density of electricity storage devices, there is an increased need for provision of a mechanism for ensuring the safety of electricity storage devices. One mechanism for ensuring the safety of electricity storage devices is a safety mechanism in which a thermal fuse is disposed in a current path (refer to PTL 2). When the battery temperature rises abnormally, the safety mechanism operates to shut off a charging/discharging current.

CITATION LIST

Patent Literature

PTL 1: Japanese Unexamined Patent Application Publication No. 8-77983
PTL 2: Japanese Unexamined Patent Application Publication No. 2002-260631

SUMMARY OF INVENTION

Technical Problem

Since molten salt batteries have a relatively high degree of safety, a safety mechanism including a thermal fuse has not been provided on molten salt batteries. Other factors for not providing a safety mechanism including a thermal fuse on molten salt batteries may include the ion conductivity and viscosity of molten salt electrolytes. In use of existing molten salt batteries, by heating a molten salt electrolyte to a temperature of about 80° C. to 100° C., the ion conductivity and viscosity are optimized. As a result, in the molten salt batteries, the difference between the battery working temperature and the thermal fuse operating temperature is smaller than that in other batteries. Consequently, when a safety mechanism including a thermal fuse is provided on molten salt batteries, the safety mechanism may frequently malfunction, and the batteries cannot be used stably in some cases.

However, in recent years, research and development on materials for molten salt electrolytes has advanced, and it has become easy to use molten salt electrolytes in a lower-temperature range. As a result, it has become possible to use molten salt batteries in a wide temperature range from a low temperature to a high temperature. On the other hand, there has been an increased demand for higher capacity molten salt batteries. In order to meet the demand, technology development for ensuring a higher level of safety of molten salt batteries is required. Consequently, there is a need for mounting a safety mechanism including a thermal fuse component on molten salt batteries. In particular, in the case where a molten salt battery is used in a high temperature range, technology development is urgently needed so that the safety mechanism is not operated by mistake when operation is not necessary, and the safety mechanism is operated reliably when operation is necessary.

As described above, in a molten salt battery having a particularly high capacity, it is desirable to provide a safety mechanism including a thermal fuse on the molten salt battery. The reason for this is that, in a power-supply unit that uses a molten salt battery, for example, there could be a case where a battery protection circuit (BMS) does not function normally. In such a case, it is anticipated that the molten salt battery is charged to a level exceeding the full-charge state (overcharged).

Solution to Problem

An aspect of the present invention relates to a molten salt battery including an electrode group which includes a first electrode, a second electrode, and a separator electrically insulating the first electrode and the second electrode; a molten salt electrolyte; a bottomed case which houses the electrode group and the molten salt electrolyte, the bottomed case having an opening; a cover plate which seals the opening of the case; a first external terminal of the first electrode and a second external terminal of the second electrode which are provided on the cover plate; a bus bar component fixed to the first external terminal; a first insulating part which is interposed between the first external terminal and the bus bar component so as to electrically insulate the bus bar component and the first external terminal; a thermal fuse component which is electrically connected to the bus bar component and the first external terminal and provides electrical continuity between the bus bar component and the first external terminal when the ambient temperature is lower than a reference temperature T1; and a fixing member which fixes the thermal fuse component to the cover plate in such a state that the thermal fuse component is in contact with or in close vicinity to the surface of the cover plate. The molten salt battery is configured such that a charge current is input from the bus bar component to the first external terminal through the thermal fuse component.

Advantageous Effects of Invention

The present invention can improve the safety of a molten salt battery and enables stable use of a molten salt battery.

DESCRIPTION OF EMBODIMENTS

General Description of Embodiments of the Invention

A molten salt battery according to the present invention includes an electrode group which includes a first electrode, a second electrode, and a separator electrically insulating the first electrode and the second electrode; a molten salt electrolyte; and a container which houses the electrode group and the molten salt electrolyte. The container includes a bottomed case having an opening, and a cover plate which seals the opening of the case.

The cover plate is provided with a first external terminal of the first electrode and a second external terminal of the second electrode. A bus bar component for inputting a charge current to the first electrode is fixed to the first external terminal. A first insulating part is interposed between the bus bar component and the first external terminal so as to electrically insulate the first external terminal and the bus bar component. On the other hand, a thermal fuse component is electrically connected to the bus bar component and the first external terminal so as to provide electrical continuity between the bus bar component and the first external terminal when the ambient temperature is lower than a reference temperature T1. As used herein, the term "ambient temperature" refers to the ambient temperature or surface temperature of the thermal fuse component. When the ambient temperature of the thermal fuse component reaches the reference temperature, the fuse operates to shut off the electric current between the bus bar component and the first external terminal. Note that, instead of the fuse, a current shut-off mechanism, such as a bimetal or PTC device, can be used.

The thermal fuse component is fixed to the cover plate outside the container, for example, by a fixing member including a resin, in such a state that the thermal fuse component is in contact with or in close vicinity to the surface of the cover plate. The molten salt battery according to this embodiment is configured such that a charge current is input from the bus bar component to the first external terminal through the thermal fuse component.

In the configuration described above, a battery charging device or the like (hereinafter referred to as the "charger") is not directly connected to the first external terminal, but is connected to the first external terminal with the bus bar component and the thermal fuse component interposed therebetween. Thereby, for example, when the battery falls into an overcharge state and the battery temperature rises abnormally, the thermal fuse component operates, and the charge current can be shut off. Consequently, it is possible to prevent the battery from being damaged by continuation of charging beyond the overcharge state. Furthermore, it is possible to prevent problems, such as an abnormal increase in the internal pressure of the battery. Thereby, the safety of the molten salt battery is improved. In the event of an abnormal increase in the internal pressure of the battery, a gas relief valve (break valve) or the like operates, and thereafter, it becomes impossible to use the battery.

Preferably, the thermal fuse component is not placed, for example, on the surface (external surface) of the case, but is placed in contact with or in close vicinity to the surface (external surface) of the cover plate (hereinafter referred to as being "placed in close vicinity to", which includes the case of being placed in contact with). Since the case is located close to the electricity-generating elements (electrode group and molten salt electrolyte) of the battery, it is preferable to place the thermal fuse component in close vicinity to the surface of the case from the viewpoint that changes in temperature of the electricity-generating elements can be directly reflected in the operation of the thermal fuse component. However, in many cases, the molten salt battery may be used as an assembled battery in which a plurality of molten salt batteries are connected in series and/or in parallel and stacked so as to be in close contact with each other. In such cases, there may be a case where it is difficult to place the thermal fuse component in close vicinity to the surface of the case.

In this embodiment, since the thermal fuse component is placed in close vicinity to the surface of the cover plate, even in the case where it is difficult to place the thermal fuse component in close vicinity to the surface of the case as described above, a safety mechanism including a thermal fuse component can be mounted on each individual molten salt battery. More specifically, in this embodiment, while an external terminal and a bus bar component, which are normally to be directly connected to each other, are insulated by a first insulating part, the two components are indirectly connected to each other with a thermal fuse component interposed therebetween. Consequently, since the thermal fuse component is placed in the vicinity of the external terminal, the thermal fuse component can be easily placed in close vicinity to the cover plate. Thereby, it becomes easy to mount a safety mechanism including a thermal fuse component on each individual molten salt battery. The details thereof will be described later.

Furthermore, the cover plate is located farther from the electricity-generating elements than the case. Accordingly, the temperature of the vicinity of the surface of the cover plate is slightly different from the temperature of the electricity-generating elements. Therefore, in the case where the safety mechanism including the thermal fuse component is placed in close vicinity to the surface of the cover plate having such a positional relationship, it can be a problem if the safety mechanism operates reliably. The present inventors have confirmed, with sufficient reproducibility and reliability, that the safety mechanism does not malfunction and operates reliably even in the case where the safety mechanism is placed in close vicinity to the surface of the cover plate.

Furthermore, as described above, molten salt batteries can be used in a wide temperature range compared with other batteries. For example, a molten salt battery can be used in a wide temperature range such that the temperature T2 (hereinafter referred to as the "working temperature") of the case (member that houses the electricity-generating elements (electrode group and molten salt electrolyte)) during use of the battery is 0° C. to 70° C. Consequently, the molten salt battery may be frequently used in a high temperature range, and in such a case, the difference between the reference temperature T1 at which the thermal fuse is operated and the working temperature T2, (T1–T2), is decreased. In this respect, since there is usually a space between the cover plate and the electricity-generating elements, the change in temperature of the cover plate is mild relative to the change in temperature of the electricity-generating elements. In other words, the change in temperature of the electricity-generating elements is time-averaged and transmitted to the cover plate. As a result, the thermal fuse component does not operate when it is not actually necessary to shut off the battery current, and malfunction of the thermal fuse component can be suppressed.

On the other hand, by fixing the thermal fuse component to the cover plate in such a state that the thermal fuse component is in contact with or in close vicinity to the surface of the cover plate, the change in temperature of the cover plate can be accurately reflected in the operation of the thermal fuse component. Accordingly, for example, in the case where a problem occurs in the battery protection circuit (BMS) of a power-supply unit that uses a molten salt battery of the present invention, it is possible to prevent the molten salt battery from being damaged, and it is possible to secure the safety of the molten salt battery.

Furthermore, since the change in temperature of the cover plate can be accurately reflected in the operation of the thermal fuse component, even if, for example, the operating temperature (reference temperature T1) of the thermal fuse component is set higher than ever before, the thermal fuse component can be operated in a timely manner. Consequently, it is possible to increase the difference between the operating temperature of the thermal fuse component and the normal working temperature of the case or the electrode group during use of the molten salt battery. Thereby, malfunction of the thermal fuse can be effectively prevented, and the molten salt battery can be stably used.

According to an embodiment of the present invention, preferably, the molten salt battery is configured such that the discharge current is directly output from the first external terminal without being passed through the bus bar component and the thermal fuse component. That is, preferably, a load apparatus (or an apparatus that operates using the molten salt battery as a power source) is directly connected to the first external terminal without the bus bar component and the thermal fuse component being interposed therebetween. Thereby, even in the case where the load apparatus is an apparatus that requires a large current, it is possible to prevent an increase in temperature of the thermal fuse component itself due to the large current. Accordingly, it is possible to prevent malfunction of the thermal fuse component because of an increase in the ambient temperature of the thermal fuse component.

Specific configurations in order to incorporate a bus bar component and a thermal fuse component in a charge current path and in order not to incorporate a bus bar component and a thermal fuse component in a discharge current path will be described below.

Figure 7:
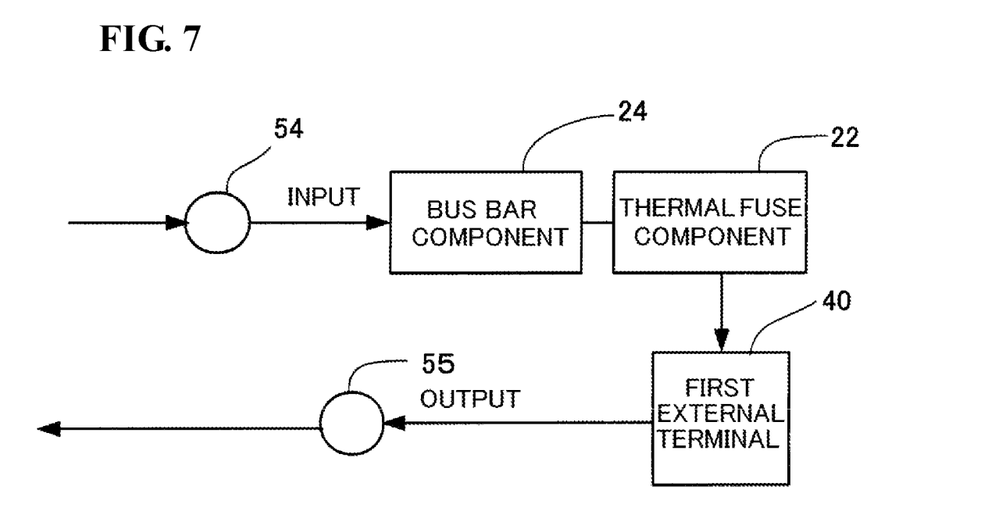
FIG. 7 is a block diagram showing an example of connecting the molten salt battery shown in FIG. 1 to an external device.

As shown in FIG. 7, in the case where a power-supply unit including a molten salt battery of the present invention is provided with a first connector (hereinafter referred to as the "charging connector") 54 for connecting a charger to a power-supply unit including a molten salt battery of the present invention and a second connector (hereinafter referred to as the "discharging connector") 55 for connecting a load apparatus, which are independent with each other, the charging connector 54 is connected to a bus bar component 24. On the other hand, the discharging connector 55 is directly connected to the first external terminal 40 without the bus bar component 24 and the thermal fuse component 22 being interposed therebetween. Thereby, the charge current can be input from the bus bar component 24 through the thermal fuse component 22 to the first external terminal 40, and the discharge current can be output directly from the first external terminal 40 without being passed through the bus bar component 24 and the thermal fuse component 22. Although not shown, each of the charging connector 54 and the discharging connector 55 is also connected to a second external terminal 42 (refer to FIG. 1).

Figure 8:
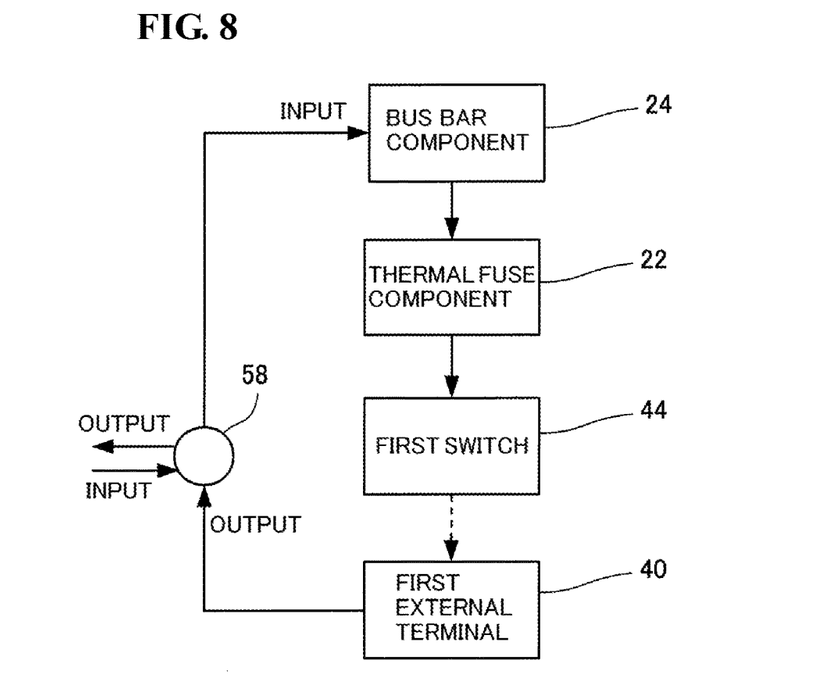
FIG. 8 is a block diagram showing a first variation example of a molten salt battery according to an embodiment of the present invention.
Figure 9:
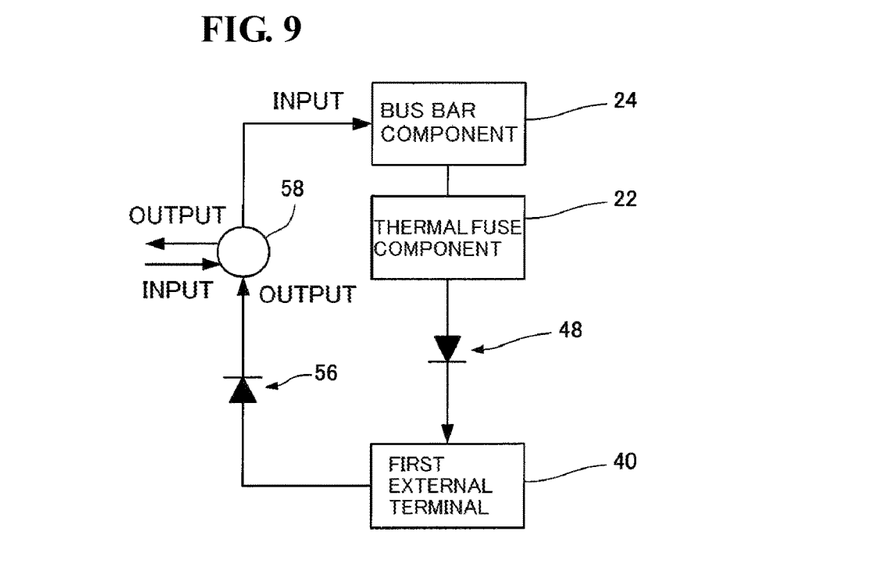
FIG. 9 is a block diagram showing a second variation example of a molten salt battery according to an embodiment of the present invention.

As shown in FIGS. 8 and 9, it is also conceivable to provide a third connector (hereinafter referred to as the "charging/discharging connector") 58 which serves as both a charging connector and a discharging connector on a power-supply unit (not shown) including a molten salt battery of the present invention. In such a case, both a current path in which a charge current is input to a first external terminal 40 from a bus bar component 24 through a thermal fuse component 22 and a current path in which a discharge current is directly output from the first external terminal without being passed though the bus bar component 24 and the thermal fuse component 22 are established to the charging/discharging connector 58. In this case, by providing a switch, such as a transistor, or a diode on the molten salt battery, the current path can be switched easily. As in the case of FIG. 7, the charging/discharging connector 58 is also connected to the second external terminal 42.

Specifically, as shown in FIG. 8, a first switch 44 electrically connected to a thermal fuse component 22 and a first external terminal 40 is provided on a molten salt battery. The first switch 44 operates such that electrical continuity is provided between the thermal fuse component 22 and the first external terminal 40 during charging, and electrical continuity between the thermal fuse component 22 and the first external terminal 40 is removed during discharging. For example, the first switch 44 may include a transistor. Note that, the first switch 44 may be disposed between the bus bar component 24 and the thermal fuse component 22.

Alternatively, as shown in FIG. 9, a diode 48 which is electrically connected to a thermal fuse component 22 and a first external terminal 40 is provided on a molten salt battery.

The diode 48 operates such that electrical continuity is provided between the thermal fuse component 22 and the first external terminal 40 during charging, and the current between the thermal fuse component 22 and the first external terminal 40 is shut off during discharging. Furthermore, another diode 56 is disposed between a charging/discharging connector 58 and the first external terminal 40 so as to prevent a charge current from flowing from the charging/discharging connector 58 to the first external terminal 40. Note that, the diode 48 may be disposed between the bus bar component 24 and the thermal fuse component 22.

The configuration described above facilitates inputting of the charge current from the bus bar component through the thermal fuse component to the first external terminal, and outputting of the discharge current directly from the first external terminal without being passed through the bus bar component and the thermal fuse component.

Figure 10:
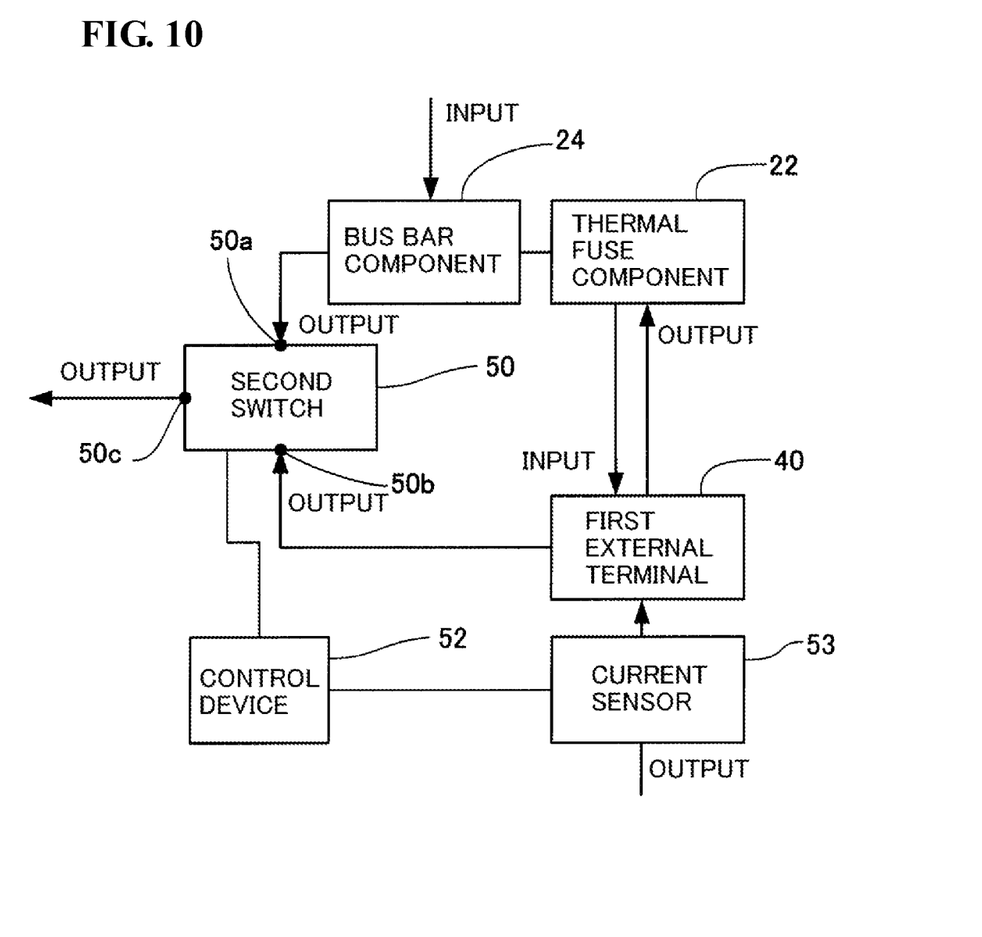
FIG. 10 is a block diagram showing a third variation example of a molten salt battery according to an embodiment of the present invention.

Furthermore, it is also possible to switch the output path of the discharge current depending on the magnitude of the discharge current. Specifically, as shown in FIG. 10, a second switch 50 is provided on a molten salt battery according to this embodiment. A power-supply unit including the molten salt battery according to this embodiment is provided with a control device 52 which controls switching of the second switch 50 and a current sensor 53 which detects the discharge current output through the first external terminal 40. The second switch 50 has a first input terminal 50a to be connected to the bus bar component 24, a second input terminal 50b to be directly connected to the first external terminal 40, and an output terminal 50c for outputting the discharge current.

On the basis of the detection result of the current sensor 53, when a discharge current output from the first external terminal 40 is less than a reference current value (e.g., 50 A), the control device 52 switches the second switch 50 such that the discharge current is output from the first external terminal through the thermal fuse component and the bus bar component. Furthermore, when a discharge current is equal to or more than the reference current value, the control device 52 switches the second switch 50 such that the discharge current is directly output from the first external terminal without being passed through the bus bar component and the thermal fuse component. Thereby, when a discharge current is a large current, the discharge current is output without being passed through the thermal fuse component and the bus bar component. Consequently, it is possible to prevent the thermal fuse component from malfunctioning because the discharge current is a large current.

The first external terminal preferably includes a columnar member. The thermal fuse component preferably includes a ring-shaped input terminal into which the first external terminal is to be inserted and a ring-shaped output terminal into which the first external terminal is to be inserted. Thereby, it is possible to produce a molten salt battery having a compact structure. In this case, the input terminal of the thermal fuse component is electrically connected to the bus bar component and electrically insulated from the first external terminal. In an opposite way, the output terminal of the thermal fuse component is electrically insulated from the bus bar component and electrically connected to the first external terminal. Thereby, the charge current from the bus bar component is input to the thermal fuse component through the input terminal of the thermal fuse component and led to the first external terminal through the output terminal.

Furthermore, by using a resin as the fixing member, the thermal fuse component can be easily fixed to the cover plate. In this case, preferably, a silicone is used as the resin. A silicone contains a polysiloxane structure and is one of the materials having the highest thermal conductivity among resins. Therefore, for example, even in the case where the fixing member is interposed between the thermal fuse component and the cover plate, i.e., the case where the thermal fuse component is not in contact with the cover plate, the temperature of the cover plate can be accurately reflected in the ambient temperature of the thermal fuse component. Thereby, when the temperature of the molten salt battery rises to a temperature at which the battery current should be shut off, it is possible to easily operate the thermal fuse component in a timely manner.

Preferably, the difference between the upper limit temperature T2max of the temperature range of the temperature (hereinafter referred to as the "working temperature) T2 of the case or the electrode group when the battery is used and the operating temperature (reference temperature T1) of the thermal fuse component, T1−T2max: ΔT, is set at 10 to 30 degrees. By setting the temperature difference ΔT at 10 degrees or more, it becomes easy to suppress malfunction of the thermal fuse component. By setting the temperature difference ΔT at 30 degrees or less, it becomes easy to operate the thermal fuse in a timely manner. Thereby, it becomes easy to prevent the battery from being damaged, and safety can be improved.

Furthermore, preferably, the cover plate has a concave portion that houses at least a part of the thermal fuse component. Thereby, it becomes easy to accurately reflect the change in temperature of the cover plate in the operation of the thermal fuse component.

The term "molten salt battery" refers to a battery which includes a molten salt electrolyte and uses alkali metal ions as charge carriers. In the positive electrode and the negative electrode, Faradaic reactions involving alkali metal ions proceed. Examples of the molten salt battery include sodium-ion molten salt batteries (sodium-ion secondary batteries) and lithium-ion molten salt batteries (lithium-ion secondary batteries). In particular, the present invention is suitable for application to sodium-ion molten salt batteries.

The first electrode includes a first current collector and a first active material held on the first current collector. The second electrode includes a second current collector and a second active material held on the second current collector. The first current collector preferably includes a first metal porous body. For example, when the first electrode is a positive electrode, it is preferable to use a metal porous body containing aluminum for the first current collector.

In order to increase the capacity of an electricity storage device, it is desired to increase as much as possible the amount of an active material per unit area to be held on a current collector. However, when a large amount of an active material is held on an existing current collector made of a metal foil, the thickness of the active material layer increases, and the average distance between the active material and the current collector increases. Consequently, the current-collecting property of the electrode decreases, contact between the active material and the molten salt electrolyte is limited, and charge-discharge properties are likely to be impaired.

Accordingly, it is preferable to use a metal porous body having interconnected pores and a high porosity as a current collector. The metal porous body is produced, for example, by a method in which a metal layer is formed on the surface of a skeleton of a resin foam, such as a urethane foam, having interconnected pores, then the resin foam is thermally decomposed, and the metal is further subjected to reduction treatment.

Furthermore, in the case where the electrode group includes a plurality of first electrodes, each of the first current collectors of the plurality of first electrodes preferably has a tab-shaped first connecting portion for electrically connecting to an adjacent first current collector.

The second current collector can also include a second metal porous body. When the second electrode is a negative electrode of a sodium-ion molten salt battery, it is preferable to use a metal porous body containing aluminum for the second current collector. When the second electrode is a negative electrode of a lithium-ion molten salt battery, it is preferable to use a metal porous body containing copper for the second current collector. In the case where the electrode group includes a plurality of second electrodes, each of the second current collectors of the plurality of second electrodes can also be provided with a tab-shaped second connecting portion for connecting to an adjacent second current collector. The second connecting portions can be arranged so as to overlie each other along the stacking direction of the electrodes group.

The first metal porous body and the second metal porous body each need to have a pore structure such that the surface area (hereinafter also referred to as the "effective surface area") on which the active material is to be held is larger than that of a mere metal foil or the like. From such a viewpoint, as each of the first metal porous body and the second metal porous body, a metal porous body having a three-dimensional mesh-like, hollow skeleton, such as Celmet (registered trademark of Sumitomo Electric Industries, Ltd.) or Aluminum-Celmet (registered trademark of Sumitomo Electric Industries, Ltd.) which will be described later, is most preferable from the standpoint that the effective surface area per unit volume can be markedly increased. In addition, as each of the first metal porous body and the second metal porous body, a nonwoven fabric, a punched metal, an expanded metal, or the like can be used. Note that a nonwoven fabric, Celmet, and Aluminum-Celmet are porous bodies having a three-dimensional structure, and a punched metal and an expanded metal are porous bodies having a two-dimensional structure.

Because of a large surface area, a metal porous body, such as the one described above, can hold a large amount of an active material and is likely to hold a molten salt electrolyte. Therefore, the metal porous body is considered to be suitable as an electrode for an electricity storage device. In the case where a plurality of electrodes of the same polarity, each including a metal porous body as a current collector, are used, the current collectors of the same polarity are connected in parallel.

Detailed Description of Embodiments of the Invention

Embodiments of the present invention will be described in detail below with reference to the drawings.

Figure 1:
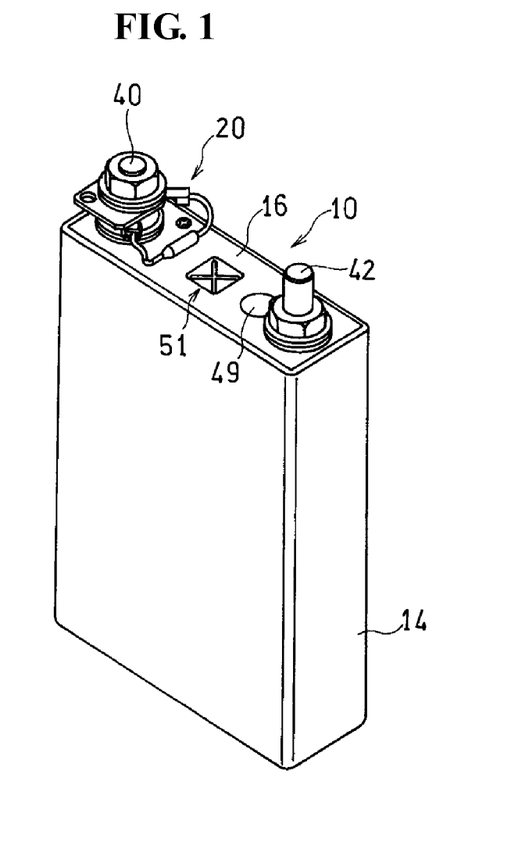
FIG. 1 is a perspective view showing an appearance of a molten salt battery according to an embodiment of the present invention.
Figure 2A:
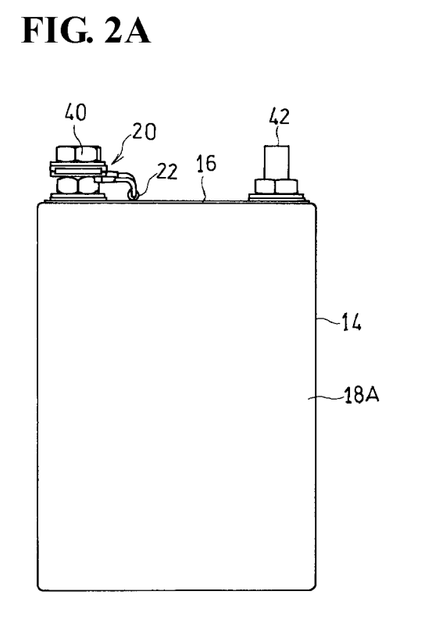
FIG. 2A is a front elevational view of the molten salt battery shown in FIG. 1.
Figure 2B:
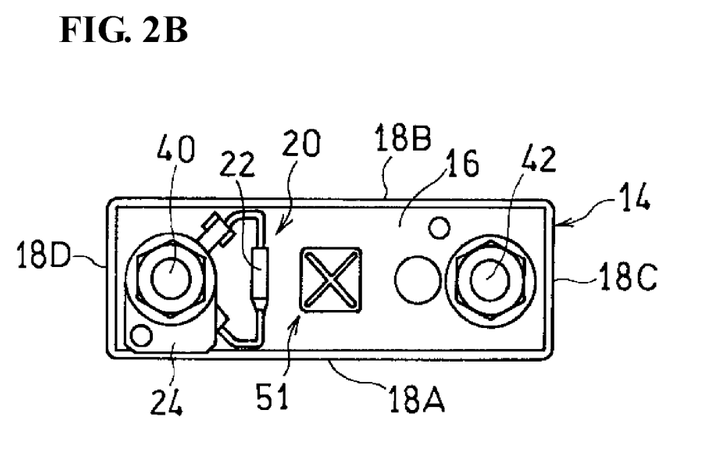
FIG. 2B is a top view of the molten salt battery shown in FIG. 1.
Figure 2C:
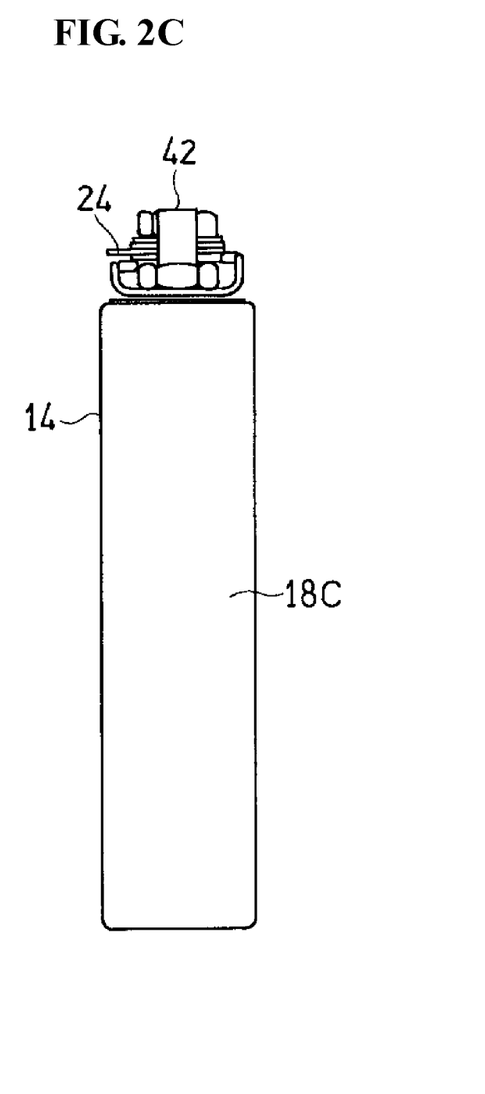
FIG. 2C is a side elevational view of the molten salt battery shown in FIG. 1.

FIG. 1 is a perspective view showing an appearance of a molten salt battery according to an embodiment of the invention. FIG. 2A is a front elevational view, FIG. 2B is a top view, and FIG. 2C is a side elevational view of the molten salt battery. It is intended that the scope of the present invention is not limited to the description below, but is determined by appended claims, and includes all variations of the equivalent meanings and ranges to the claims.

A molten salt battery 10 according to an example shown in the drawing includes an electrode group (not shown) which includes a first electrode and a second electrode, a case 14 which houses the electrode group together with a molten salt electrolyte (not shown), and a cover plate 16 which seals an opening of the case 14. In the molten salt battery 10, the case 14 and the cover plate 16 constitute a container of the molten salt battery. In the example shown in the drawing, the case 14 is rectangular, and the present invention is suitable for application to a molten salt battery including a rectangular case, such as the one shown in the drawing.

One of the first electrode and the second electrode is a positive electrode, and the other is a negative electrode. The positive electrode includes a positive electrode current collector and a positive electrode active material. The negative electrode includes a negative electrode current collector and a negative electrode active material. Accordingly, one of the first current collector and the second current collector is a positive electrode current collector, and the other is a negative electrode current collector.

The first current collector (hereinafter referred to as the "positive electrode current collector") can include a first metal porous body. The second current collector (hereinafter referred to as the "negative electrode current collector") can also include a second metal porous body. The thickness of the positive electrode current collector is preferably 0.1 to 10 mm. The thickness of the negative electrode current collector is preferably 0.1 to 10 mm.

As the first current collector (positive electrode current collector), Aluminum-Celmet (registered trademark of Sumitomo Electric Industries, Ltd.) is particularly preferable from the viewpoint that it has a high porosity (e.g., 90% or more), has continuous pores, and does not substantially contain closed pores. Furthermore, as the second current collector (negative electrode current collector), for the same reason, Celmet (registered trademark of Sumitomo Electric Industries, Ltd.) made of copper or nickel, or Aluminum-Celmet is particularly preferable. Celmet or Aluminum-Celmet will be described later in detail.

The cover plate 16 is provided with a columnar first external terminal 40 electrically connected to one or more first electrodes and a columnar second external terminal 42 electrically connected to one or more second electrodes. A male screw may be formed on the outer peripheral portion of each of the first external terminal 40 and the second external terminal 42. Furthermore, a current branch part, which will be described later in detail, is attached to the first external terminal 40.

A liquid injection hole (not shown) is provided at the position near the second external terminal on the cover plate 16 so that a molten salt electrolyte can be injected into the case after the opening of the case 14 has been sealed with the cover plate 16. The liquid injection hole is filled with a liquid plug 49. A gas relief valve 51, which breaks when the internal pressure of the case increases to a reference pressure and releases gas inside the case, is provided in the central part of the cover plate 16.

The rectangular case 14 has a sidewall having four rectangular planar portions and a bottom that is perpendicular to the four planar portions. The four planar portions includes two groups of planar portions, two groups having different areas. A first group includes two planar portions 18A and 18B which are parallel to each other and have a relatively large area. A second group includes two planar portions 18C and 18D which are parallel to each other and have a relatively small area.

Figure 3:
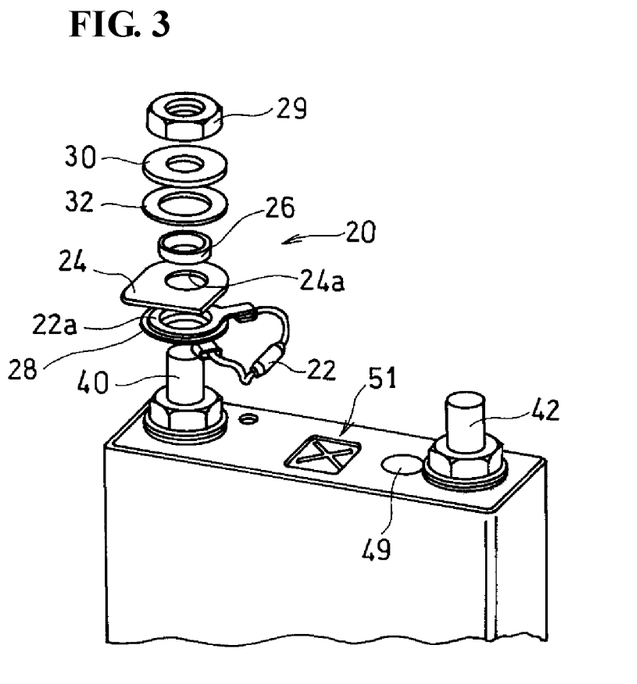
FIG. 3 is an exploded perspective view showing details of a current branch part of the molten salt battery shown in FIG. 1.
Figure 4:
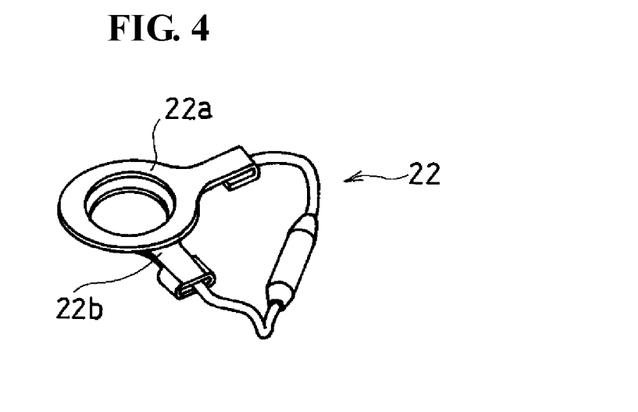
FIG. 4 is a perspective view of a thermal fuse component included in the current branch part shown in FIG. 3.

FIG. 3 is an exploded perspective view showing a current branch part attached to the first external terminal. A current branch part 20 includes a thermal fuse component 22 which provides electrical continuity between a bus bar component and a first external terminal when the temperature TS of the cover plate 16 (or the ambient temperature of the thermal fuse component 22) is lower than a reference temperature T1 (e.g., a temperature of 80° C. to 100° C.), and shuts off the electric current between the bus bar component and the first external terminal when the ambient temperature TS reaches the reference temperature T1. The thermal fuse component 22 has an input terminal 22a and an output terminal 22b.

Furthermore, the current branch part 20 includes a plate-like bus bar component 24 fixed to a first external terminal 40 so that a charge current can be input and a ring-shaped or cylindrical first insulating part 26. The bus bar component 24 has a through-hole 24a into which the first external terminal 40 is inserted. The first insulating part 26 is fixed to the first external terminal 40 so as to be interposed between the inner peripheral surface of the through-hole 24a and the outer peripheral surface of the first external terminal 40. Thereby, the bus bar component 24 is fixed to the first external terminal 40 without being in contact with the first external terminal 40 at the through-hole 24a.

On the other hand, the bus bar component 24 is fixed to the first external terminal 40 while being in contact with the input terminal 22a of the thermal fuse component 22. Thereby, electrical continuity is provided between the bus bar component 24 and the input terminal 22a. The output terminal 22b of the thermal fuse component 22 is fixed to the first external terminal 40 with electrical continuity being provided between the output terminal 22b and the first external terminal 40. A planar, ring-shaped second insulating part 28 is placed between the input terminal 22a and the output terminal 22b of the thermal fuse component 22, and the input terminal 22a and the output terminal 22b are electrically insulated.

The first insulating part 26 is inserted into the input terminal 22a of the thermal fuse component 22, and thereby, the input terminal 22a and the first external terminal 40 are electrically insulated. On the other hand, the output terminal 22b of the thermal fuse component 22 is in contact with the first external terminal 40, and the output terminal 22b and the first external terminal 40 are electrically connected.

Owing to the configuration described above, when the temperature of the cover plate 16 is lower than a reference temperature T1, electrical continuity is provided between the first external terminal 40 and the bus bar component 24 through the thermal fuse component 22. Thereby, when the temperature of the cover plate 16 is lower than the reference temperature T1, a charge current can be input from the bus bar component 24 to the first external terminal 40 through the thermal fuse component 22.

The input terminal 22a and the output terminal 22b of the thermal fuse component 22, the first insulating part 26, and the second insulating part 28 can be fixed to the first external terminal 40, for example, by tightening a nut 29 onto the male screw of the first external terminal 40. A washer 30 may be placed between the nut 29 and the bus bar component 24. In this case, a planar, ring-shaped third insulating part 32 may be placed between the washer 30 and the bus bar component 24. Thereby, the washer 30 and the bus bar component 24 are electrically insulated. A discharging line (not shown) can be connected to the first external terminal 40, for example, between the nut 29 and the washer 30 or between the washer 30 and the third insulating part 32.

Figure 5:
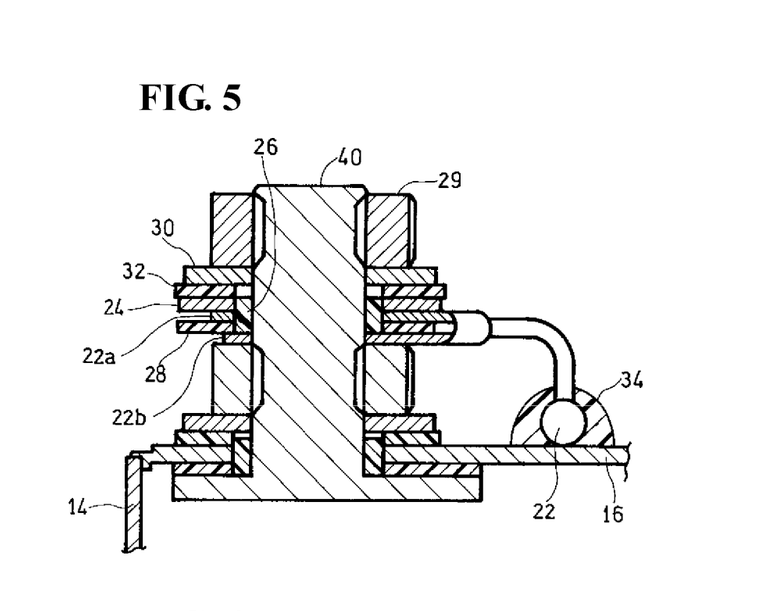
FIG. 5 is a partially enlarged sectional view of the molten salt battery shown in FIG. 1, illustrating an example of placing the current branch part.
Figure 6:
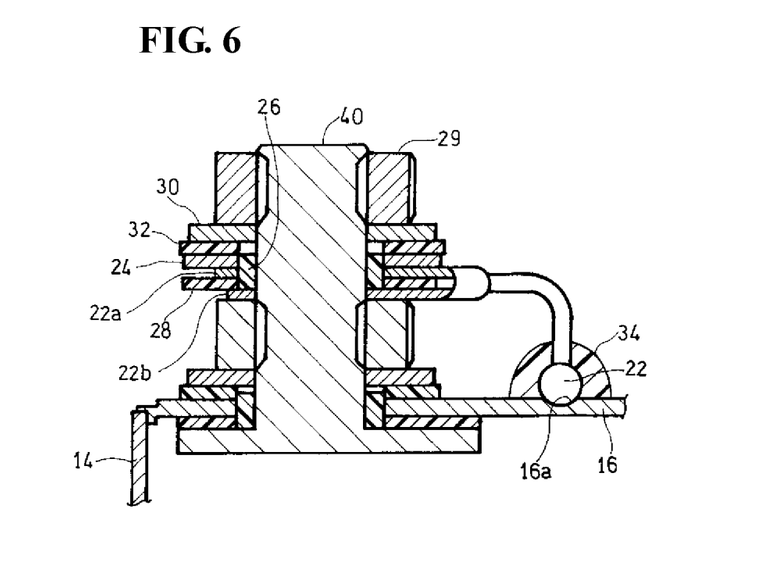
FIG. 6 is a partially enlarged sectional view of the molten salt battery shown in FIG. 1, illustrating another example of placing the current branch part.

As shown in FIG. 5, the thermal fuse component 22 can be fixed to the cover plate 16 by a fixing member 34, for example, containing a silicone. In this case, the thermal fuse component 22 may be in contact with the cover plate 16, or may be placed in close vicinity to the cover plate 16, without being in contact with the cover plate 16, for example, with a shortest distance of 1 mm or less. In this case, preferably the space between the thermal fuse component 22 and the cover plate 16 is filled with the fixing member 34. However, more preferably, the thermal fuse component 22 and the cover plate 16 are in contact with each other from the viewpoint that the temperature of the cover plate 16 can be accurately reflected in the operation of the thermal fuse component 22. For the same reason, as shown in FIG. 6, preferably, the cover plate 16 is provided with a concave portion 16a that houses at least a part of the thermal fuse component 22.

A metal porous body used as a first current collector or a second current collector will now be described in detail. Preferably, the metal porous body has a three-dimensional mesh-like, hollow skeleton. Since the skeleton has a cavity inside, the metal porous body is very light despite having a bulky three-dimensional structure. Such a metal porous body can be produced by subjecting a resin porous body having continuous spaces to a plating treatment with a metal constituting a current collector, and further decomposing or dissolving the inside resin by a heating treatment or the like. A three-dimensional mesh-like skeleton is formed by the plating treatment, and the skeleton can be made hollow inside by the decomposition or dissolution of the resin.

The resin porous body is not particularly limited as long as it has continuous spaces, and a resin foam, a nonwoven fabric made of a resin, or the like can be used. After the heat treatment, the components remaining in the skeleton (the resin, decomposition products, unreacted monomers, additives contained in the resin, and the like) may be removed by cleaning or the like.

Examples of the resin constituting the resin porous body include thermosetting resins, such as thermosetting polyurethanes and melamine resins; and thermoplastic resins, such as olefin resins (polyethylenes, polypropylenes, etc.) and thermoplastic polyurethanes. When a resin foam is used, although depending on the type of resin and the production method of the foam, the pores formed inside the foam each become cell-shaped. Subsequently, cells are interconnected to form continuous spaces. In such a foam, cell-shaped pores are small and the size thereof is likely to be more uniform. In particular, when a thermosetting polyurethane or the like is used, the size and shape of pores are likely to be more uniform.

In the plating treatment, as long as a metal layer serving as a current collector can be formed on the surface (including the surface inside the continuous spaces) of the resin porous body, a known plating treatment method, such as an electrolytic plating method or molten salt plating method, can be employed. A three-dimensional mesh-like metal porous body corresponding to the shape of the resin porous body is formed by the plating treatment. In the case where a plating treatment is performed by an electrolytic plating method, it is desirable to form a conductive layer prior to electrolytic plating. The conductive layer may be formed on the surface of the resin porous body by electroless plating, vapor deposition, sputtering, or the like, or application of a conducting agent. Alternatively, the conductive layer may be formed by immersing the resin porous body in a dispersion liquid containing a conducting agent.

After the plating treatment, by removing the resin porous body by heating, a cavity is formed in the skeleton of the metal porous body, and the skeleton is made hollow inside. The width of the cavity inside the skeleton is, for example, on average, 0.5 to 5 μm, preferably 1 to 4 μm, or 2 to 3 μm. The resin porous body can be removed by performing a heat treatment, as necessary, while appropriately applying a voltage. Furthermore, the porous body which has been subjected to a plating treatment may be immersed in a molten salt plating bath, and a heat treatment may be performed while applying a voltage.

The metal porous body has a three-dimensional mesh-like structure corresponding to the shape of the resin foam. Specifically, the current collector has a large number of pores each having the shape of a cell, and thus has a continuous pore constituted by the interconnected cell-shaped pores. Openings (or windows) are formed between adjacent cell-shaped pores. Preferably, the openings lead to a state in which pores are interconnected. The shape of the openings (or windows) is not particularly limited, but is, for example, substantially polygonal (substantially triangular, substantially quadrangular, substantially pentagonal, and/or substantially hexagonal). The term "substantially polygonal" refers to a polygonal shape and a shape that is similar to a polygonal shape (e.g., a polygonal shape whose corners are rounded, a polygonal shape whose sides are curved, and the like).

The metal porous body has a very high porosity and a large specific surface area. That is, a large amount of an active material can be made to adhere to a large area including the surface area inside the spaces. Furthermore, while filling the spaces with a large amount of the active material, the contact area between the metal porous body and the active material is large and the porosity can be increased. Therefore, the active material can be effectively used. In a positive electrode of a molten salt battery, usually by incorporating a conductive assistant, electrical conductivity is enhanced. On the other hand, by using a metal porous body such as the one described above as a positive electrode current collector, it is likely to secure high electrical conductivity even when the amount of the conductive assistant added is decreased. Accordingly, it is possible to more effectively enhance the rate characteristics and energy density (and capacity) of the battery.

The specific surface area (BET specific surface area) of the metal porous body is, for example, 100 to 700 cm$^2$/g, preferably 150 to 650 cm$^2$/g, and more preferably 200 to 600 cm$^2$/g.

The porosity of the metal porous body is, for example, 40% to 99% by volume, preferably 60% to 98% by volume, and more preferably 80% to 98% by volume. Furthermore, in the three-dimensional mesh-like structure, the average pore diameter (average diameter of interconnected cell-shaped pores) is, for example, 50 to 1,000 μm, preferably 100 to 900 μm, and more preferably 350 to 900 μm. However, the average pore diameter is smaller than the thickness of the metal porous body (or the electrode). Note that the skeleton of the metal porous body is deformed by rolling, resulting in changes in the porosity and average pore diameter. The ranges of the porosity and average pore diameter described above are the porosity and average pore diameter of the metal porous body before being subjected to rolling (before being filled with a mixture).

As the metal constituting the positive electrode current collector of the molten salt battery (the metal used for plating), for example, at least one selected from aluminum, aluminum alloys, nickel, and nickel alloys may be used. As the metal constituting the negative electrode current collector of the molten salt battery (the metal used for plating), for example, at least one selected from, in addition to the metals exemplified as the metal constituting the positive electrode current collector, copper, copper alloys, nickel, and nickel alloys may be used.

A positive electrode or a negative electrode is formed, for example, by filling spaces of a metal porous body obtained as described above with an electrode mixture, and as necessary, compressing the current collector in the thickness direction. The electrode mixture contains, as an essential component, an active material, and may contain, as an optional component, a conductive assistant and/or a binder.

The thickness $w_m$ of the mixture layer formed by filling the electrode mixture in the cell-shaped pores of the current collector is, for example, 10 to 500 μm, preferably 40 to 250 μm, and more preferably 100 to 200 μm. The thickness $w_m$ of the mixture layer is preferably 5% to 40%, and more preferably 10% to 30%, of the average pore diameter of cell-shaped pores so that spaces can be secured on the inner side of the mixture layer formed inside the cell-shaped pores.

As the negative electrode active material of the molten salt battery, a substance that reversibly holds alkali metal ions, such as sodium ions and lithium ions, can be used. Examples of such a substance include carbon materials, spinel-type lithium titanium oxides, spinel-type sodium titanium oxides, silicon oxides, silicon alloys, tin oxides, tin alloys, and the like. Examples of carbon materials include graphite, graphitizable carbon (soft carbon), non-graphitizable carbon (hard carbon), and the like.

As the positive electrode active material of the molten salt battery, a transition metal compound that reversibly holds alkali metal ions is suitably used. As the transition metal compound, a sodium-containing transition metal oxide (e.g., $NaCrO_2$), a lithium-containing transition metal oxide (e.g., $LiCoO_2$), or the like can be used. In each of the positive electrode and the negative electrode, the reaction of reversibly holding alkali metal ions is, for example, a reaction in which alkali metal ions are occluded and released (inserted and desorbed).

The type of the conductive assistant to be incorporated into the electrode mixture is not particularly limited. Examples thereof include carbon black, such as acetylene black or Ketjen black; electrically conductive fiber, such as carbon fiber or metal fiber; and nanocarbon, such as carbon nano-tube. The amount of the conductive assistant is, for example, 0.1 to 15 parts by mass, preferably 0.5 to 10 parts by mass, relative to 100 parts by mass of the active material.

The thickness of each of the first electrode and the second electrode is 0.2 mm or more, preferably 0.5 mm or more, and more preferably 0.7 mm or more. Furthermore, the thickness of each of the first electrode and the second electrode is 5.0 mm or less, preferably 4.5 mm or less, and more preferably 4.0 mm or less or 3.0 mm or less. These lower limit values and upper limit values can be combined arbitrarily. The thickness of each of the first electrode and the second electrode may be 0.5 to 4.5 mm or 0.7 to 4.0 mm.

The separator has ion permeability and are interposed between the first electrode and the second electrode to prevent short-circuiting therebetween. The separator has a porous structure, and by holding a molten salt electrolyte in its pores, ions are permeated. As the separator, a microporous film, a nonwoven fabric (including paper), or the like can be used.

An electrolyte of the molten salt battery (molten salt electrolyte) contains a salt of an alkali metal cation and an anion (first anion). Examples of the alkali metal cation include a sodium ion, a lithium ion, and the like. Examples of the first anion include fluorine-containing acid anions ($PF_6^-$, $BF_4^-$, and the like), chlorine-containing acid anions ($ClO_4^-$), a bis(sulfonyl)amide anion, a trifluoromethanesulfonic acid anion ($CF_3SO_3^-$), and the like.

From the standpoint of improvement in heat resistance, preferably, the molten salt electrolyte includes 90% by mass or more of a molten salt (ionic substance composed of anions and cations).

Preferably, the molten salt includes, in addition to the alkali metal cation, an organic cation. Examples of the organic cation include nitrogen-containing cations, sulfur-containing cations, phosphorus-containing cations, and the like. As a counter anion to the organic cation, a bis(sulfonyl) amide anion is preferable. Among bis(sulfonyl)amide anions, a bis(fluorosulfonyl)amide anion ($N(SO_2F)_2^-$) (hereinafter abbreviated to $FSA^-$), a bis (trifluoromethylsulfonyl) amide anion ($N(SO_2CF_3)_2^-$) (hereinafter abbreviated to $TFSA^-$), a (fluorosulfonyl)(trifluoromethylsulfonyl)amide anion ($N(SO_2F)(SO_2CF_3)^-$), and the like are preferable.

Examples of nitrogen-containing cations include a quaternary ammonium cation, a pyrrolidinium cation, a pyridinium cation, an imidazolium cation, and the like.

Examples of the quaternary ammonium cation include tetraalkylammonium cations (tetra$C_{1-10}$alkylammonium cations), such as a tetramethylammonium cation, an ethyltrimethylammonium cation, a hexyltrimethylammonium cation, a tetraethylammonium cation ($TEA^+$), a methyltriethylammonium cation ($TEMA^+$), and the like.

Examples of the pyrrolidinium cation include a 1,1-dimethylpyrrolidinium cation, a 1,1-diethylpyrrolidinium cation, a 1-ethyl-1-methylpyrrolidinium cation, a 1-methyl-1-propylpyrrolidinium cation ($MPPY^+$), a 1-butyl-1-methylpyrrolidinium cation ($MBPY^+$), a 1-ethyl-1-propylpyrrolidinium cation, and the like.

Examples of the pyridinium cation include 1-alkylpyridinium cations, such as a 1-methylpyridinium cation, a 1-ethylpyridinium cation, and a 1-propylpyridinium cation.

Examples of the imidazolium cation include a 1,3-dimethylimidazolium cation, a 1-ethyl-3-methylimidazolium cation ($EMI^+$), a 1-methyl-3-propylimidazolium cation, a 1-butyl-3-methylimidazolium cation ($BMI^+$), a 1-ethyl-3-propylimidazolium cation, a 1-butyl-3-ethylimidazolium cation, and the like.

Examples of the present invention will be described below. However, it is to be understood that the present invention is not limited to the examples below.

Example 1

A sodium molten salt battery (rated capacity: 26 Ah) having an appearance such as the one shown in FIG. 1 was assembled. As a case, A3003 (aluminum alloy) with a thickness (thickness of the planar portion) of 0.9 mm was used. As a cover plate, A3003 (aluminum alloy) with a thickness (thickness of the planar portion) of 1.5 mm was used. As a thermal fuse component, S9E51084C (product number) manufactured by Emerson Japan, Ltd. was used. The thermal fuse component was fixed to the cover plate, in contact with the cover plate, using a resin material containing a silicone (silicone rubber, KE-3467 (product number) manufactured by Shin-Etsu Chemical Co., Ltd).

The operating temperature of the thermal fuse component, i.e., the reference temperature (surface temperature of the thermal fuse component when the fuse operates) T1 was set at 84° C. As a bus bar component, a copper plate with a thickness of 1.5 mm was used. As a molten salt electrolyte, a mixture obtained by mixing Na.FSA and MPPY.FSA at a molar ratio of 40:60 was used.

100 Such sodium molten salt batteries (hereinafter, referred to as batteries A) were fabricated. The batteries A were subjected to a 100-cycle charge-discharge test under the (test conditions 1) described below. The charge-discharge test was conducted after the battery temperature reached the working temperature T2. Furthermore, the battery temperature was increased to the working temperature T2, and in order to maintain the temperature, a heater was installed on a surface of the sidewall of the case to heat the battery. In order to measure the battery temperature, a temperature sensor was installed on a surface of the sidewall of the case on the opposite side of the sidewall provided with the heater. In Example 1 and Comparative Examples 1 and 2, the temperature measured by the temperature sensor was considered as the battery temperature.

A charge current was set such that it was input to the first external terminal (specifically, the positive electrode external terminal) from the bus bar component through the thermal fuse component. A discharge current was set such that it was output directly from the first external terminal without being passed through the bus bar component and the thermal fuse component. Furthermore, after the 100-cycle charge-discharge test was completed, one battery A was subjected to 101st cycle charging. In order to bring the battery A into an overcharge state, after the charging termination voltage was reached, charging was further continued with the same charge current, and the course was observed (overcharge test).

(Test Conditions 1)

Rated capacity: 26 Ah

Charge current: 26 A

Working temperature T2: 70° C. (T1−T2=14 degrees)

Charging termination voltage: 3.3 V

Discharging termination voltage: 1.5 V

Comparative Example 1

Using the resin material described above, 100 batteries (hereinafter, referred to as batteries X), which were different from the batteries A in Example 1 in that the thermal fuse component was fixed to the case, in contact with the case, were fabricated. A thermal fuse component was brought into contact with the sidewall of the case on the same side of the sidewall of the case provided with a temperature sensor. A charge-discharge test and an overcharge test were conducted using 100 batteries X as in Example 1.

Comparative Example 2

100 Batteries (hereinafter, referred to as batteries Y), which were different from the batteries A in Example 1 in that a bus bar component and a thermal fuse component were not included, were fabricated. A charge-discharge test was conducted using 100 batteries Y as in Example 1 except that a charge current and a discharge current were directly input and output to and from the first external terminal without being passed through the bus bar component and the thermal fuse component.

The results of Example 1 and Comparative Examples 1 and 2 are shown in Table 1 below.

TABLE 1

| | Number of batteries malfunctioned during charge-discharge test. | Results of overcharge test |
|---|---|---|
| Batteries A | None | Fuse operated at ambient temperature of 83° C. |
| Batteries X | 3 | Fuse operated at ambient temperature of 81° C. |
| Batteries Y | — | Smoke was generated when battery temperature rose to 151° C. |

As is evident from Table 1, in Example 1 and Comparative Example 1 on which a safety mechanism including a thermal fuse component was mounted, the batteries were brought into an overcharge state, the thermal fuse component operated when the ambient temperature reached close to the reference temperature T1 (84° C.), the battery current was shut off, and charging was stopped. On the other hand, in Comparative Example 2 on which the safety mechanism was not mounted, charging was continued even when the batteries were brought into an overcharge state, and a problem occurred in the batteries. These results have confirmed that, by mounting a safety mechanism including a thermal fuse component on a molten salt battery, the safety of the molten salt battery can be improved.

However, in Comparative Example 1 in which the thermal fuse component was placed in close vicinity to the surface of the case, partly for the reason that the working temperature T2 in the test conditions 1 was relatively high at 70° C., the thermal fuse component malfunctioned in three batteries during the 100-cycle charge-discharge test which was not in an overcharge state. In contrast, in Example 1 in which the thermal fuse component was place in close vicinity to the surface of the cover plate, there were no batteries in which the thermal fuse component malfunctioned during the 100-cycle charge-discharge test.

The reason for the malfunctioning of the thermal fuse component in Comparative Example 1 is believed to be that the change in temperature of the molten salt battery was large. More specifically, even when the average temperature was 70° C., the battery temperature might momentarily reach the reference temperature, and it is believed that, in Comparative Example 1, the thermal fuse component malfunctioned in such a case. On the other hand, in Example 1, it is believed that, even when the battery temperature momentarily reached the reference temperature, the change in temperature was averaged and transmitted to the cover plate, and the peak temperature was lower than that in Comparative Example 1, and therefore, it was possible to prevent malfunction of the thermal fuse component. These results have confirmed that, by placing a thermal fuse component in close vicinity to the surface of the cover plate, malfunction of the thermal fuse component can be suppressed.

Furthermore, another factor that could suppress malfunction of the thermal fuse component in Example 1 may be that the thermal fuse component is fixed to the cover plate by a fixing member containing a silicone. It is believed that, by using a silicone having high thermal conductivity for the fixing member, the temperature of the cover plate can be accurately reflected in the operation of the thermal fuse component. Thereby, even when the difference between the battery working temperature and the operating temperature of the thermal fuse component is small, while malfunction of the thermal fuse component is suppressed, the thermal fuse component can be reliably operated when it is necessary to shut off the battery current.

INDUSTRIAL APPLICABILITY

The present invention can improve the safety of a molten salt battery and enables stable use of a molten salt battery.

REFERENCE SIGNS LIST 10 molten salt battery
14 case
16 cover plate
16a concave portion
20 current branch part
22 thermal fuse component
22a input terminal
22b output terminal
24 bus bar component
24a through-hole
26 first insulating part
28 second insulating part
29 nut
32 third insulating part
34 fixing member
40 first external terminal
42 second external terminal
44 first switch
48 diode
49 liquid plug
50 second switch
50a first input terminal
50b second input terminal
50c output terminal
51 gas relief valve
52 control device
53 current sensor
54 charging connector
55 discharging connector
58 charging/discharging connector

The invention claimed is:
1. A molten salt battery comprising:
an electrode group which includes a first electrode, a second electrode, and a separator electrically insulating the first electrode and the second electrode;
a molten salt electrolyte;
a bottomed case which houses the electrode group and the molten salt electrolyte, the bottomed case having an opening;
a cover plate which seals the opening of the case;
a first external terminal of the first electrode and a second external terminal of the second electrode which are provided on the cover plate;
a bus bar component fixed to the first external terminal;
a first insulating part which is interposed between the first external terminal and the bus bar component so as to electrically insulate the bus bar component and the first external terminal;
a thermal fuse component which is electrically connected to the bus bar component and the first external terminal and provides electrical continuity between the bus bar component and the first external terminal when the ambient temperature is lower than a reference temperature T1; and a fixing member which fixes the thermal fuse component to the cover plate in such a state that the thermal fuse component is in contact with or in close vicinity to the surface of the cover plate,
wherein the molten salt battery is configured such that a charge current is input from the bus bar component to the first external terminal through the thermal fuse component.

2. The molten salt battery according to claim 1, wherein the molten salt battery is configured such that the discharge current is output from the first external terminal without being passed through the bus bar component and the thermal fuse component.

3. The molten salt battery according to claim 2, further comprising a first switch disposed in a current path between the bus bar component and the first external terminal,
wherein the first switch provides electrical continuity between the thermal fuse component and the first external terminal during charging, and removes electrical continuity between the thermal fuse component and the first external terminal during discharging.

4. The molten salt battery according to claim 2, further comprising a diode disposed in a current path between the bus bar component and the first external terminal,
wherein the diode provides electrical continuity between the bus bar component and the first external terminal during charging, and shuts off the current between the bus bar component and the first external terminal during discharging.

5. The molten salt battery according to claim 1, further comprising a second switch electrically connected to the bus bar component and the first external terminal,
wherein the second switch switches the output path of a discharge current such that, when the discharge current is less than a reference value, the discharge current is output from the first external terminal through the thermal fuse component and the bus bar component, and when the discharge current is equal to or more than the reference value, the discharge current is output from the first external terminal without being passed through the bus bar component and the thermal fuse component.

6. The molten salt battery according to claim 1,
wherein the first external terminal is columnar, and the thermal fuse component includes a ring-shaped input terminal into which the first external terminal is to be inserted and a ring-shaped output terminal into which the first external terminal is to be inserted;
the input terminal is electrically connected to the bus bar component and electrically insulated from the first external terminal; and
the output terminal is electrically insulated from the bus bar component and electrically connected to the first external terminal.

7. The molten salt battery according to claim 1, wherein the fixing member contains a silicone.

8. The molten salt battery according to claim 1, wherein the cover plate has a concave portion that houses at least a part of the thermal fuse component.

* * * * *